United States Patent
Gouerec

(10) Patent No.: US 12,172,458 B2
(45) Date of Patent: Dec. 24, 2024

(54) BODY FOR A WRITING, TRACING, DRAWING OR COLORING PENCIL

(71) Applicant: Société BIC, Clichy (FR)

(72) Inventor: Julien Gouerec, Boulogne-Sur-Mer (FR)

(73) Assignee: Société BIC, Clichy (FR)

( * ) Notice: Subject to any disclaimer, the term of this patent is extended or adjusted under 35 U.S.C. 154(b) by 962 days.

(21) Appl. No.: 17/274,372

(22) PCT Filed: Sep. 6, 2019

(86) PCT No.: PCT/EP2019/073817
§ 371 (c)(1),
(2) Date: Mar. 8, 2021

(87) PCT Pub. No.: WO2020/049149
PCT Pub. Date: Mar. 12, 2020

(65) Prior Publication Data
US 2022/0048312 A1    Feb. 17, 2022

(30) Foreign Application Priority Data

Sep. 7, 2018 (EP) .................................... 18306179

(51) Int. Cl.
*B43K 19/14* (2006.01)
*C08L 67/04* (2006.01)

(52) U.S. Cl.
CPC .............. *B43K 19/14* (2013.01); *C08L 67/04* (2013.01); *C08L 2205/025* (2013.01)

(58) Field of Classification Search
CPC .... B43K 19/14; C08L 67/04; C08L 2205/025
See application file for complete search history.

(56) References Cited

U.S. PATENT DOCUMENTS

| | | |
|---|---|---|
| 3,704,071 A | 11/1972 | Muller et al. |
| 5,916,950 A | 6/1999 | Obuchi et al. |
| 6,669,771 B2 | 12/2003 | Tokiwa et al. |
| 6,710,135 B2 | 3/2004 | Tan et al. |
| 7,160,977 B2 | 1/2007 | Hale et al. |
| 7,214,414 B2 | 5/2007 | Khemani et al. |
| 7,449,510 B2 | 11/2008 | Ueda et al. |
| 2009/0274920 A1 | 11/2009 | Tan et al. |
| 2012/0095169 A1 | 4/2012 | Ogawa et al. |
| 2012/0178866 A1* | 7/2012 | Kayama .............. C08L 101/16 524/425 |
| 2014/0162007 A1 | 6/2014 | Thies |
| 2020/0299504 A1 | 9/2020 | Munoz |

FOREIGN PATENT DOCUMENTS

| | | | |
|---|---|---|---|
| CN | 105907061 | 8/2016 | |
| DE | 19855325 | 6/1999 | |
| EP | 0821036 | 1/1998 | |
| EP | 1072645 | 1/2001 | |
| EP | 1264860 B1 * | 2/2011 | ............. B32B 27/10 |
| EP | 2644407 | 10/2013 | |
| FR | 2988643 | 10/2013 | |
| JP | 11-309980 | 11/1999 | |
| JP | 2005-350530 | 12/2005 | |
| JP | 4895664 B2 | 3/2012 | |
| JP | 2014005435 A * | 1/2014 | |

OTHER PUBLICATIONS

English machine translation of JP 2014005435. (Year: 2014).*
First Examination Report for corresponding Indian Application No. 202117001468, 7 pages, dated Sep. 19, 2022.
International Search Report dated Dec. 6, 2019 in corresponding International PCT Patent Application No. PCT/EP2019/073817, 6 pgs.
Written Opinion dated Dec. 6, 2019 in corresponding International PCT Patent Application No. PCT/EP2019/073817, 5 pgs.
Nobe et al., "Mechanical Properties and Morphology of Poly (Lactic Acid) Composites with Oyster Shell Particles", Advanced Materials Research, Trans Tech Publications LTD, vol. 391-392, Dec. 1, 2012 (Dec. 1, 2012), ISSN:1022-6680, DOI:10.4028/WWW.SCIENTIFIC.NET/AMR (abstract & intro.).
International Search Report dated Dec. 2, 2019 in related International PCT Patent Application No. PCT/EP2019/073816, 5 pgs.
Written Opinion dated Dec. 2, 2019 in related International PCT Patent Application No. PCT/EP2019/073816, 5 pgs.

* cited by examiner

*Primary Examiner* — Angela C Scott
(74) *Attorney, Agent, or Firm* — Ruggiero McAllister & McMahon LLC

(57) ABSTRACT

A body for a writing, tracing, drawing or coloring pencil has a composition that includes, by weight, with respect to the total weight of the body between 50% and 95% of a mixture of polylactic acid and of polybutylene succinate in a polylactic acid/polybutylene succinate ratio by weight of between 90/10 and 60/40 and between 5% and 50% of filler that can have shellfish shells and/or calcium carbonate. A writing, tracing, drawing or coloring pencil has such a body.

19 Claims, No Drawings

BODY FOR A WRITING, TRACING, DRAWING OR COLORING PENCIL

CROSS REFERENCE TO RELATED APPLICATION(S)

This application is a National Stage Application of International Application No. PCT/EP2019/073817, filed on Sep. 6, 2019, now published as WO2020/049149 and which claims priority to EP18306179.5, filed on Sep. 7, 2018, the entire contents of each of which is incorporated herein by reference.

BACKGROUND OF THE DISCLOSURE

1. Field of the Disclosure

The present disclosure relates to polymer-based bodies for writing, tracing, drawing or coloring pencils.

Such bodies are intended to replace the wood material of conventional pencils and can also be known as "synthetic wood" or "synthetic body/core".

They make it possible to grasp the pencil and to protect the lead from breaking. They thus have to be resistant to deformation in order for it not to be possible to bend them or to twist them, which would break the lead on the inside. In addition, they have to be able to be sharpened by a conventional pencil sharpener. They are generally manufactured from a polymer-based synthetic material, the density and the ability to be sharpened of which are similar to those of wood, and can be extruded. They can be expanded.

In addition, they do not exhibit splinters if ever the pencil breaks since they are polymer-based.

Two main families of thermoplastic polymers are used to date in the synthetic body of pencils: styrene polymers, such as polystyrene (PS) and acrylonitrile/butadiene/styrene (ABS), and polyolefins, such as polyethylene (PE) and polypropylene (PP). These polymers all result from the petroleum industry. For ecological reasons, it would be advantageous to be able to replace such thermoplastic polymers with biodegradable polymers.

2. Description of Related Art

The patent application FR 2 988 643 thus describes a pencil, the body of which (known as casing part in the application) is based on expanded synthetic material. It teaches that the thermoplastic materials of the casing part and of the lead part can be chosen from styrene polymers, such as polystyrene, polyolefins and biopolymers. PLA (polylactic acid) is thus the only biopolymer cited, although the only example of pencil body in this patent application is based on polymer matrix of the family of the styrene polymers.

The paper by Rie Nobe et al. (Advanced Materials Research, Vols. 391-392 (2012), pages 590-594) describes the mechanical properties and the morphology of polylactic acid composites with oyster shell particles. However, it does not at any point describe their use in pencil sheaths. In addition, it teaches that the stability of these composites decreases when the content of oyster shells increases, in comparison with PLA alone. As demonstrated in the comparative example below, PLA, as a mixture with oyster shells, does not exhibit a very good impact strength.

Thus, the inventors have noticed that the use of PLA as sole thermoplastic polymer in the body of a pencil did not make it possible to obtain good mechanical properties with regard to the resilience and the impact strength, which may present problems in the manufacturing process and with regard to the ability of the final pencil to be sharpened. Consequently, PLA "alone" does not make a good substitute for the polymers resulting from oil, such as polystyrene, in the manufacture of pencil bodies.

On the other hand, the inventors have noticed, surprisingly, that it was possible to manufacture pencil bodies having superior mechanical properties to polystyrene-based pencil bodies by using, as thermoplastic polymer, a mixture of PLA with PBS (polybutylene succinate), another biopolymer, in specific proportions, and by using an appropriate content of fillers, all the more so when the filler is of natural origin, for example oyster shells.

The application EP 0 821 036 describes a composition which can contain polylactic acid and PBS and which contains a filler and which can be used in various applications. However, pencil bodies are not indicated. In point of fact, pencil bodies have to be able to be sharpened and have to exhibit a good impact strength and a good flexural modulus, which is neither described nor suggested in this document. This document indicates the obligatory presence of crystalline inorganic fillers containing 10% by weight or more of $SiO_2$. As demonstrated in the examples below, such fillers are markedly less advantageous than inorganic fillers not containing $SiO_2$, such as oyster shells, which thus contradicts the teaching of this document.

DETAILED DESCRIPTION

The present disclosure thus relates to a body for a writing, tracing, drawing or coloring pencil, the composition of which comprises (more specifically is essentially composed of, in particular consists of), by weight, with respect to the total weight of the body:
 a) between 50% and 95% of a mixture of polylactic acid and of polybutylene succinate in a polylactic acid/polybutylene succinate ratio by weight of between 90/10 and 60/40 and
 b) between 5% and 50% of filler.

In a specific embodiment, its composition comprises (more specifically is essentially composed of, in particular consists of), by weight, with respect to the total weight of the body:
 a) between 70% and 90% of a mixture of polylactic acid and of polybutylene succinate in a polylactic acid/polybutylene succinate ratio by weight of between 80/20 and 65/45 and
 b) between 10% and 30% of filler.

The pencil body according to the disclosure thus comprises a mixture of polylactic acid, for example commercially available from Natureplast, and of polybutylene succinate, for example commercially available from Natureplast, in a polylactic acid/polybutylene succinate ratio by weight of between 90/10 and 60/40, in particular between 80/20 and 65/45, more particularly between 80/20 and 70/30, more particularly still in a ratio by weight of 70/30.

This mixture of biodegradable thermoplastic polymers serves as matrix in the pencil body according to the disclosure and makes it possible to manufacture the pencil body by extrusion and to contribute good mechanical properties, such as impact strength and resilience. It also makes it possible to contribute the ability to be sharpened to the pencil body according to the disclosure.

The content of mixture of polylactic acid and of polybutylene succinate of the pencil body according to the disclosure is thus between 50% and 95%, more specifically between 60% and 92%, more specifically between 70% and 90%, more specifically still between 80% and 90%, by weight, with respect to the total weight of the body.

The pencil body according to the present disclosure additionally comprises a filler, which can be inorganic or organic. The filler makes it possible to improve the mechanical properties of the body, such as the (3-point) flexural modulus. More specifically, it is a filler of natural origin; more specifically, the filler can be shellfish shells and/or calcium carbonate, these fillers thus specifically not containing $SiO_2$; in particular, they are shellfish shells, such as oyster shells or scallop shells, in particular oyster shells, more particularly ground oyster shells, in particular commercially available from Natureplast.

Shellfish shells are in general composed of calcium carbonate and organic compound(s). Calcium can be replaced in part by other elements such as magnesium, strontium, barium, manganese and mixture thereof.

The organic compound(s) consist(s) in the following elementary components: C, H, O, N, more specifically the organic compound(s) are proteins and/or carbohydrate.

The content of filler of the pencil body according to the disclosure is thus between 5% and 50%, more specifically between 8% and 40%, more specifically between 10% and 30%, more specifically still between 10% and 20%, by weight, with respect to the total weight of the body.

More particularly, in the case where the filler consists of shellfish shells, in particular oyster shells, more specifically ground oyster shells, in particular with a volume-average diameter (d50), measured by laser particle sizing, more specifically ranging from 10 μm to 160 μm, in particular ranging from 20 μm to 100 μm, more specifically from 30 μm to 80 μm, still more particularly of 70 μm with a Mastersizer 3000 type apparatus commercially available from Malvern, its content is specifically between 7% and 20%, more specifically between 8% and 20%, in particular between 10% and 20%, by weight, with respect to the total weight of the body.

In a particularly advantageous embodiment, the filler consists of shellfish shells, specifically oyster shells or scallop shells, in particular oyster shells, more particularly ground oyster shells, more particularly still with a volume-average diameter (d50), measured by laser particle sizing, more specifically ranging from 10 μm to 160 μm, more specifically ranging from 20 μm to 100 μm, more specifically from 30 μm to 80 μm, still more particularly of 70 μm with a Mastersizer 3000 type apparatus commercially available from Malvern.

In an advantageous embodiment, the filler has a volume-average diameter (d50), measured by laser particle sizing, more specifically ranging from 10 μm to 160 μm, more specifically ranging from 20 μm to 100 μm, more specifically from 30 μm to 80 μm, still more particularly of 70 μm with a Mastersizer 3000 type apparatus commercially available from Malvern.

In a specific embodiment, the filler does not comprise a crystalline inorganic filler containing more than 10% of $SiO_2$, in particular chosen from talc, kaolin, clays and kaolinite, more particularly as described in EPO 821 036.

In a particular embodiment, the filler does not comprise silicate, i.e. a salt combining silicon dioxide $SiO_2$ with metal oxides, such as aluminium oxides and/or magnesium oxides.

More specifically still, the filler does not comprise silicon dioxide $SiO_2$.

The pencil body according to the disclosure can additionally comprise an adhesion agent. If the adhesion agent is present, its content is between 0.1% and 10%, in particular between 1% and 6%, more particularly between 2% and 5%, by weight, with respect to the total weight of the body. More specifically, in the case where the filler consists of shellfish shells, in particular oyster shells, the content of adhesion agent is between 0.1 and 5% by weight, with respect to the total weight of the pencil body.

The adhesion agent makes it possible to improve the adhesion between the thermoplastic polymer (mixture of polylactic acid and of polybutylene succinate) and the filler, in particular when the filler has a high polarity. In particular, the adhesion agent can be polylactic acid grafted by maleic anhydride, for example sold by Natureplast or Natureworks.

The pencil body according to the present disclosure can comprise other additives, such as, for example, dyes and/or pigments, in particular in the masterbatch form, for example based on PLA, blowing agents, processing aids, lubricants, slip agents, such as stearates (calcium stearate, for example) and/or a stearamide, modifiers of the performance of the PLA (melt enhancers, which improve the strength/consistency of the molten mixture in extrusion), in particular acrylics, and a mixture of these additives. The content of additive of the pencil body according to the present disclosure, when it is present, is between 0.1% and 10% by weight, with respect to the total weight of the body.

In particular, the pencil body according to the present disclosure comprises a blowing agent, such as, for example, azodicarbonamide, or other endothermic chemical agents, in order to lighten its final weight and to help in its ability to be sharpened, more specifically in a content of between 0.1% and 1%, more specifically in a content of between 0.5% and 1%, by weight, with respect to the total weight of the body.

The pencil body according to the disclosure can also comprise dyes and/or pigments (such as red iron oxide), in particular in the masterbatch form, more particularly based on PLA. The content of dyes and/or pigments is in particular between 0.1% and 10% by weight, in particular if the dye and/or the pigment is not in the form of a masterbatch, between 0.1% and 5% by weight, more specifically between 0.5% and 3% by weight, with respect to the total weight of the pencil body according to the disclosure. In an advantageous embodiment, the dyes and/or the pigments make it possible to confer a color close to wood on the pencil body according to the disclosure.

The pencil body according to the present disclosure is more specifically extrudable.

It can also more specifically be sharpened and can in particular have the density and the ability to be sharpened similar to those of wood. More particularly, it can be sharpened by a conventional pencil sharpener.

It is thus not the body of a mechanical pencil.

In addition, the present disclosure relates to a writing, tracing, drawing or coloring pencil comprising the body according to the present disclosure.

It is not a mechanical pencil.

More specifically, in the pencil according to the disclosure, the body according to the present disclosure surrounds, in particular concentrically, the lead or an intermediate protective layer positioned between the lead and the body according to the disclosure.

In particular, the lead is a polymer-based lead and not a calcined lead.

More specifically, the pencil according to the disclosure is obtained by extrusion, in particular by coextrusion of the lead/optional protective layer/body according to the disclosure.

More specifically still, it is a graphite pencil or a colored pencil.

In a specific embodiment of the present disclosure, the pencil according to the disclosure comprises an additional decorative layer, more specifically of varnish, surrounding, in particular concentrically, the body according to the disclosure. More specifically, the decorative layer is made of a material compatible with that of the body according to the disclosure.

More specifically, the pencil according to the present disclosure can have a hexagonal, round or triangular section, more specifically a round or hexagonal section. More specifically, it can comprise a means for erasing, such as a rubber, at the non-sharpened end of the pencil.

A better understanding of the disclosure will be obtained on reading the description of the examples which follow.

Examples

Different compositions (examples 1 to 4 according to the disclosure, mixture of PLA and PBS without filler, polystyrenes of different categories) were tested, before and after extrusion, with regard to their mechanical properties. The flexural modulus of the pencil body has to be greater than or equal to 2000 MPa.

These compositions are prepared by compounding on a twin-screw extruder which will intimately mix the various ingredients of the formula, the operation being carried out at a temperature of 160° C. to 200° C. A formulated rod is obtained at the twin-screw extruder outlet, which rod is granulated. It is these small granules which are subsequently injection molded in the form of standardized test specimens.

The tensile tests were carried out according to the standard NF EN ISO 527 of 2012.

The bending tests were carried out according to the standard NF EN ISO 178 of 2011 according to the following characteristics:
  Equipment: testing device of 3367 type (Instron)
  Force cell: 1 kN
  Distance between supports: 64 mm
  Test method: A
  Test rate: 2 mm·min$^{-1}$
  Sampling: Dumbbell test specimen ISO A
  Number of test specimens tested: 10
  Conditioning: minimum 24 h at 23° C.±2° C. and 50% RH±10% RH
  Test temperature: 23.6° C.
  Test hygrometry: 30%.

The unnotched Charpy impact tests were carried out according to the standard NF EN ISO 179-1 of 2010 according to the following characteristics:
  Equipment: Impactor II pendulum (Ceast)
  Hammer: 15 J
  Distance of supports: 62 mm
  Sampling: Type 1A test specimen (molded test specimen)
  Positioning: Standing
  Conditioning: minimum 24 h at 23° C.±2° C. and 50% RH±10% RH
  Test temperature: 23.7° C.
  Test hygrometry: 27%

The viscosity measurements (viscosity index of the material—Melt Flow Index: MFI) were carried out according to the standard NF EN ISO 1133 of 2011, method B, according to the following characteristics:
  Stoving: 18 h at 90° C.
  Equipment: Modular melt flow tester (Ceast)
  Capillary die diameter: 2.095 mm
  Capillary die length: 8 mm
  Test temperature: 190° C.
  Load applied: 2.16 kg
  Time interval: 30 s The measurement of the density (MFI) was carried out according to the standard NF EN ISO 1183 of 2012, method A (method by immersion), according to the following characteristics:
  Equipment: ALS/PLS-A01 precision balance (Kern)—density measurement attachments
  Liquid: distilled water
  Test temperature: 23° C.
  Sampling: injected part The results are collated in the following tables 1 and 2:

TABLE 1

| Formulation | Mixture A 80% PLA + 20% PBS | Mixture B 70% PLA + 30% PBS | Recycled PS | Virgin HIPS | Virgin GPPS |
|---|---|---|---|---|---|
| Performance qualities of the composition before extrusion ||||||
| Flexural modulus (MPa) | 2869 | 2557 | 1500 | 1850 | 2900 |
| Impact strength (kJ/m$^2$) | 32.7 | 63.8 | [8]* | [11]* | 8 |
| MFI (g/10 min) (200° C.-5 kg) | 12.26 | 18.29 | 5 | 4.5 | 4 |
| MFI (g/10 min) (190° C.-2.16 kg) | 3.2 | 3.91 | — | — | — |
| Density (g/cm$^3$) | 1.25 | 1.26 | 1.04 | 1.04 | 1.05 |
| Performance qualities of the extruded rods ||||||
| Resistance to sharpening (N · mm) | — | — | 150 | — | — |
| Breaking force (daN) | — | 25.69 | 11.70 | — | — |
| Elongation (mm) | — | 4.86 | 12.50 | — | — |
| Diameter (mm) | 7.4 | 7.7 | 7.3 | — | — |

*these values were produced on notched test specimens (Charpy impact tests) according to the standard NF EN ISO 179-1 of 2010

TABLE 2

| Formulation | Example 1: 90% Mixture B + 10% CaCO₃ with a volume-average diameter of 40 μm | Example 2: 80% Mixture B + 20% CaCO₃ with a volume-average diameter of 40 μm | Example 3: 90% Mixture B + 10% ground oyster shells with a volume-average diameter of 70 μm | Example 4: 80% Mixture B + 20% ground oyster shells with a volume-average diameter of 70 μm |
|---|---|---|---|---|
| Performance qualities of the composition before extrusion | | | | |
| Flexural modulus (MPa) | 2526.9 | 2704.6 | 3029 | 3551 |
| Elongation modulus (MPa) | 2345.6 | 2176.2 | 2831.9 | 3015.6 |
| Impact strength (kJ/m²) | | | 23.7 | 17.6 |
| MFI (g/10 min) (200° C.-5 kg) | | | 25.88 | >77.3 |
| MFI (g/10 min) (190° C.-2.16 kg) | | | 5.36 | 24.84 |
| Density (g/cm³) | | | 1.28 | 1.39 |
| Performance qualities of the extruded rods | | | | |
| Resistance to sharpening (N · mm) | | | 241 | — |
| Breaking force (daN) | | | 22.15 | 10.80 |
| Elongation (mm) | | | 4.43 | 3.00 |
| Diameter (mm) | | | 6.8 | 6.5 |

The results clearly show superior mechanical properties of the examples according to the disclosure in comparison with polystyrene, and even of the filler-free PLA/PBS mixtures in comparison with polystyrene, and also the advantage of using, as filler, oyster shells in comparison with calcium carbonate (the results in elongation and in bending are better for examples 3 and 4 in comparison with examples 1 and 2).

Pencils of hexagonal section were manufactured by coextrusion with a polypropylene-based graphite lead (composition as % by weight with respect to the total weight of the lead: 26% polypropylene, 8% kaolin, 47% graphite, 9% black pigment coated with polyethylene wax, 8% calcium stearate, 2% additive) or a colored lead based on styrene polymer, a sheath, a body having the composition according to example 3 and a varnish. The thickness of the body is 3.5 mm in the case of the colored leads and 4.5 mm in the case of the graphite leads.

The pencils obtained are comparable dimensionally and with regard to weight with the conventional pencils having a graphite or colored lead, the body of which is made of polystyrene.

In addition, the processability with the oyster shells is good.

The use of oyster shells thus makes it possible to obtain a good resistance of the pencil and a not excessively high sharpening effort.

Furthermore, no problem is observed with regard to the lead during the operation of sharpening the pencil: the lead does not break and does not become detached from the pencil.

Different compositions (mixture of PLA and PBS with kaolin as filler (comparative example 2), mixture of PLA alone with, as filler, oyster shells (comparative example 1)) were tested, before extrusion, with regard to their mechanical properties.

These compositions are prepared by compounding on a twin-screw extruder which will intimately mix the various ingredients of the formula, the operation being carried out at a temperature of 160° C. to 200° C. A formulated rod is obtained at the twin-screw extruder outlet, which rod is granulated. It is these small granules which are subsequently injection molded in the form of standardized test specimens.

The bending and impact strength tests were carried out using the same protocol as the above examples. The results are collated in table 3 below.

TABLE 3

| Formulation | Comparative example 2: 90% Mixture B + 10% kaolin | Comparative example 1: 90% PLA + 10% ground oyster shells with a volume-average diameter of 70 μm |
|---|---|---|
| Performance qualities of the composition before extrusion | | |
| Flexural modulus (MPa) | 2936 | 4453 |
| Impact strength (kJ/m²) | 27.5 | 16.0 |

It is noticed that the impact strength of comparative example 1 is less than that of example 3 according to the disclosure and that the flexural modulus of comparative example 1 is less than that of example 3.

The use of PLA alone or of fillers containing $SiO_2$, such as kaolin, thus gives poorer results than the PLA/PBS mixture with, as filler, oyster shells.

The invention claimed is:

1. A pencil body for a writing, tracing, drawing or coloring pencil, the body having a composition comprising, by weight, with respect to a total weight of the body:

between 50% and 95% of a mixture of polylactic acid and polybutylene succinate in a ratio by weight of polylactic acid/polybutylene succinate that is between 90/10 and 60/40; and between 5% and 50% of a filler that is shellfish shells and/or calcium carbonate, wherein the filler does not comprise $SiO_2$.

wherein the polylactic acid and the polybutylene succinate are the sole thermoplastic polymers of the body.

2. The pencil body as claimed in claim 1, wherein the ratio by weight of polylactic acid/polybutylene succinate is between 80/20 and 65/45.

3. The pencil body as claimed in claim 1, wherein the composition comprises, by weight, with respect to the total weight of the body:

between 70% and 90% of a mixture of polylactic acid and of polybutylene succinate in a ratio by weight of polylactic acid/polybutylene succinate that is between 80/20 and 65/45 and between 10% and 30% of the filler.

4. The pencil body as claimed in claim 1, wherein the filler is shellfish shells.

5. The pencil body as claimed in claim 1, wherein the shellfish shells are ground oyster shells.

6. The pencil body as claimed in claim 1, wherein the shellfish shells have a volume-average diameter (d50) ranging from 10 μm to 160 μm measured by laser particle sizing.

7. The pencil body as claimed in claim 1, wherein the shellfish shells have a volume-average diameter (d50) ranging from 30 μm to 80 μm measured by laser particle sizing.

8. The pencil body as claimed in claim 1, wherein the filler is between 7 and 20%.

9. The pencil body as claimed in claim 1, wherein the filler is between 8 and 20%.

10. The pencil body as claimed in claim 1, wherein the filler is between 10 and 20%.

11. The pencil body as claimed in claim 1, wherein the mixture of polylactic acid/polybutylene succinate is in a ratio between 80/20 and 70/30.

12. The pencil body as claimed in claim 1, wherein the composition further comprises between 0.1% and 10% by weight with respect to the total weight of the body of an adhesion agent.

13. The pencil body as claimed in claim 12, wherein the adhesion agent is polylactic acid grafted by maleic anhydride.

14. The pencil body as claimed in claim 1, wherein the composition further comprises between 0.1% and 10% by weight with respect to the total weight of the body of an additive.

15. The pencil body as claimed in claim 14, wherein the additive is chosen from dyes and/or pigments, blowing agents, processing aids, lubricants, slip agents, modifiers of the performance of the polylactic acid and their mixtures.

16. The pencil body as claimed in claim 1, wherein the pencil body is extrudable.

17. A writing, tracing, drawing or coloring pencil comprising the pencil body as claimed in claim 1.

18. The pencil as claimed in claim 17, wherein the pencil is obtained by extrusion.

19. The pencil as claimed in claim 17, wherein the pencil is a graphite pencil or a colored pencil.

\* \* \* \* \*